United States Patent
Brooks et al.

(10) Patent No.: US 10,779,528 B2
(45) Date of Patent: Sep. 22, 2020

(54) WATERFOWL DECOY SUPPORT

(71) Applicants: William B. Brooks, Nashport, OH (US); Brandon L. Rexroad, Nashport, OH (US)

(72) Inventors: William B. Brooks, Nashport, OH (US); Brandon L. Rexroad, Nashport, OH (US)

(73) Assignee: BB Waterfowl, LLC, Nashport, OH (US)

(*) Notice: Subject to any disclaimer, the term of this patent is extended or adjusted under 35 U.S.C. 154(b) by 119 days.

(21) Appl. No.: 15/715,119

(22) Filed: Sep. 25, 2017

(65) Prior Publication Data
US 2018/0125062 A1    May 10, 2018

Related U.S. Application Data

(60) Provisional application No. 62/398,605, filed on Sep. 23, 2016.

(51) Int. Cl.
*A01M 31/06* (2006.01)
*F16M 13/02* (2006.01)

(52) U.S. Cl.
CPC ............ *A01M 31/06* (2013.01); *F16M 13/02* (2013.01); *F16M 2200/08* (2013.01)

(58) Field of Classification Search
CPC .................................................. A01M 31/06
See application file for complete search history.

(56) References Cited

U.S. PATENT DOCUMENTS

| | | | | |
|---|---|---|---|---|
| 5,983,552 A * | 11/1999 | Nelson | ............... | A01M 31/06 43/2 |
| 8,127,487 B2 * | 3/2012 | Gazalski | ............... | A01M 31/06 43/3 |
| 9,532,565 B2 * | 1/2017 | Anson | ............... | F16M 11/00 |
| 2008/0029659 A1 * | 2/2008 | Weber | ............... | A01M 31/06 248/156 |
| 2013/0111800 A1 * | 5/2013 | Pifer | ............... | A01M 31/06 43/3 |

OTHER PUBLICATIONS

DCVRoutdoors DCVR Superior Outdoor Products—Amphibious Stake Jul. 21, 2011 https://www.youtube.com/watch?v=eRX68ZrO27Y (Year: 2011).*

* cited by examiner

*Primary Examiner* — Richard G Davis
(74) *Attorney, Agent, or Firm* — Miracle IP; Bryce D. Miracle

(57) ABSTRACT

A waterfowl decoy support is provided which boasts the ability to provide support to existing flotation type waterfowl decoys for placement on a ground surface. The support is designed such that it is easily attachably removable to and from the keel of the flotation type waterfowl decoy. Moreover, when the waterfowl decoy support is attached to the decoy and positioned in the ground, the decoy support imitates the lower extremities of a live waterfowl animal, providing an authentic, highly effective waterfowl appearance.

19 Claims, 4 Drawing Sheets

WATERFOWL DECOY SUPPORT

This application is based upon and claims the priority filing date of the previously filed, U.S. Provisional patent application entitled "WATERFOWL DECOY SUPPORT" filed Sep. 23, 2016, Ser. No. 62/398,605 the entire disclosure of which is hereby incorporated herein by reference.

BACKGROUND

The present invention relates to waterfowl decoys and, in particular, to an improved waterfowl decoy support which is attachably removable to existing flotation type decoys and simultaneously mimics the appearance of waterfowl legs.

Waterfowl decoys are relatively expensive, yet they are a necessary accessory for successfully hunting all types of waterfowl. Waterfowl decoys come in different types imitating certain waterfowl characteristics in order to lure live waterfowl to a certain location. Waterfowl are hunted on both land and water, particularly around areas which maintain water. Thus, either land or water or both types of decoys are required for a hunt. This means the hunter needs one set of decoys having supports for placement on land and a separate second set of decoys adapted for flotation on a body of water, thus increasing the cost of participating in the sport by a significant amount.

Flotation waterfowl decoys are specialized devices in that they are provided with ballasted keels to keep them floating in an upright position. The keels extend from beneath the decoy, and generally have some means of attaching an anchor line or the like. Thus, a flotation type decoy is not adapted for placement on land, as the keel does not allow the decoy to sit upright when placed upon a solid surface. Decoys adapted for use on land do not have the ballasted keel of a flotation type decoy and thus do not remain upright to present a realistic appearance when placed upon a body of water, and may not even be capable of remaining afloat on the water.

For the foregoing reason, there is a need for a waterfowl decoy support which is attachably removable to existing flotation type waterfowl water decoys in order to provide adaptability to land.

SUMMARY

In accordance with the invention, a waterfowl decoy support is provided which boasts the ability to provide support to existing flotation type waterfowl decoys for placement on a ground surface. The support is designed such that it is easily attachably removable to and from the keel of the flotation type waterfowl decoy. Moreover, when the waterfowl decoy support is attached to the decoy and positioned in the ground, the decoy support imitates the lower extremities of a live waterfowl animal, providing an authentic, highly effective waterfowl appearance.

A version of the present application encompassing a waterfowl decoy support comprises (a) a first and second elongated support rods adaptable to be inserted into the ground, each having a base end, a decoy attachment end opposite the base end, and a support rod longitudinal axis; (b) a decoy suspension arm supported by the first and second elongated rods at the decoy attachment end, the decoy suspension arm comprising a first and second rails aligned in parallel extending from first end to an opposing second end forming an elongated decoy gripping slot therebetween; and (c) a first and second decoy imitation extremity portions, each extremity portion operably configured to attach to a segment of a respective support rod, wherein the extremity portion is configured to resemble the lower extremities of a live waterfowl animal, adapted to at least partially conceal the respective segment of the respective support rod.

In some versions, the flotation waterfowl comprises a decoy body defining a length extending between an aft end and a forward end and having a midpoint, wherein the first and second elongated support rods are positioned aft of the midpoint and normal to the longitudinal axis of the keel gripping slot.

In other versions, the flotation waterfowl decoy body defines a length extending between an aft end and a forward end having a midpoint, wherein the first and second decoy imitation extremity portions are positioned aft of the midpoint.

In some versions, the decoy gripping slot defines a length extending between an aft end and a forward end having a midpoint, wherein the first and second elongated support rods are positioned at or aft of the midpoint and substantially normal to the longitudinal axis of the keel gripping slot.

In other certain versions, the decoy gripping slot defines a length extending between an aft end and a forward end having a midpoint, wherein the first and second decoy imitation extremity portions are positioned aft of the midpoint.

In some versions, the decoy suspension arm first end or second end expands outward forming a coplanar v-shaped configured to easily receive the keel of the decoy.

In other versions of the application, the extremity portion comprises a leg portion and a foot portion, wherein the leg portion defines a tube which is configured to receive a segment of the respective elongated support rod therethrough and the foot portion extending forward of the respective support rod. In a version, the leg portion and foot portion form an integral plastic piece. In another version, the foot portion comprises a flat bottom, thereby providing a realistic adaption to a ground surface.

In certain versions of the application, the extremity portion is operably slidable along the length of the respective support rod and/or is removably attached to the respective elongated support rod.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where.

DETAILED DESCRIPTION

Referring now to the figures wherein the showings are for purposes of illustrating a preferred version of the invention only and not for purposes of limiting the same, the present invention is a waterfowl decoy support configured to be attachably removable to existing floatation type waterfowl decoys, which permits support of the decoy in the ground while imitating the lower extremities of a live waterfowl animal.

The following detailed description is of the best currently contemplated modes of carrying out exemplary versions of the invention. The description is not to be taken in the limiting sense, but is made merely for the purpose of illustrating the general principles of the invention, since the scope of the invention is best defined by the appended claims.

Various inventive features are described below that can each be used independently of one another or in combination with other features.

Figure 5:
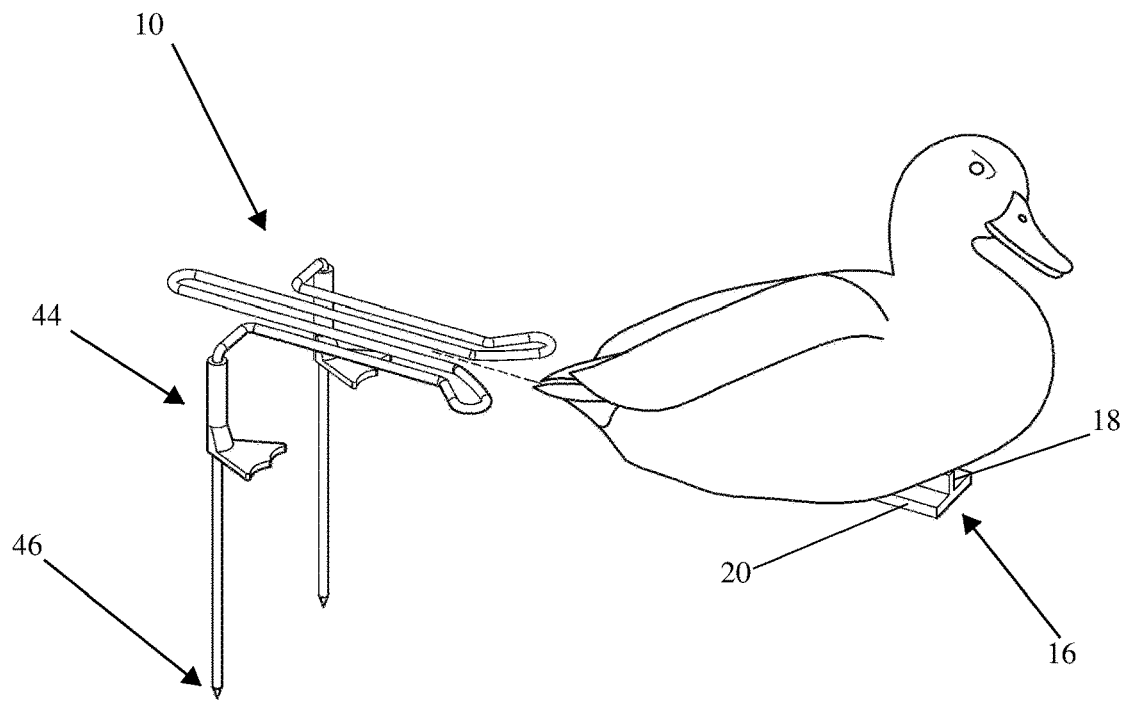
FIG. 5 is an illustrated operational perspective view showing attachment of a waterfowl decoy to a version of the waterfowl decoy support.
Figure 6:
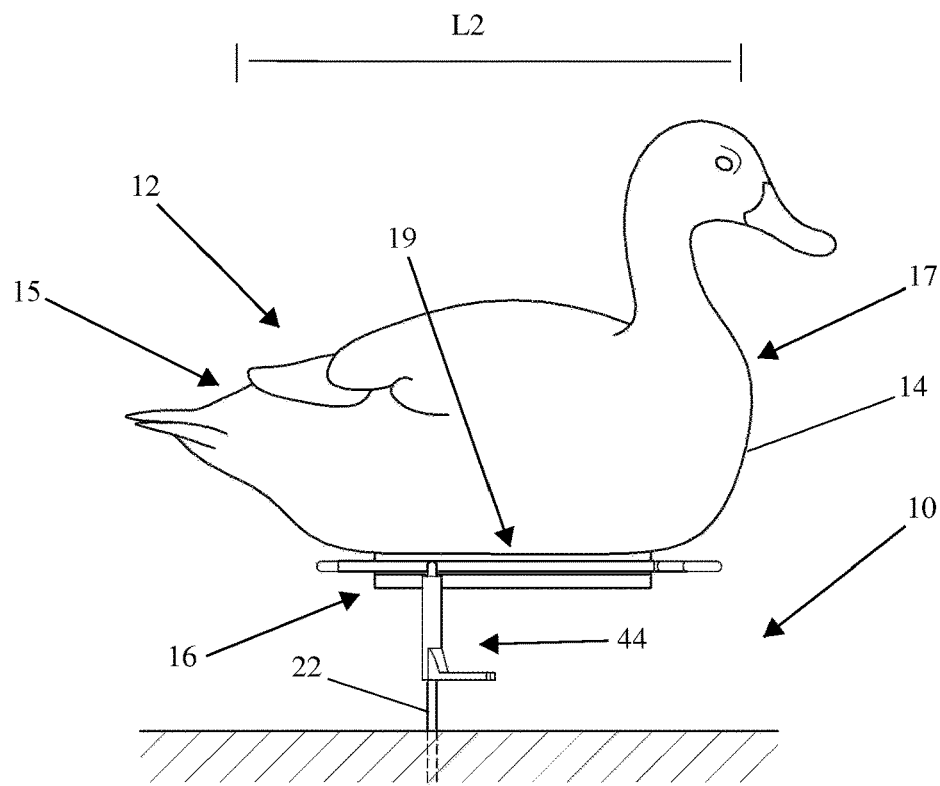
FIG. 6 is a right side elevation view of the version shown in FIG. 5 with the attached waterfowl decoy shown partially inserted into a ground surface.
Figure 7:
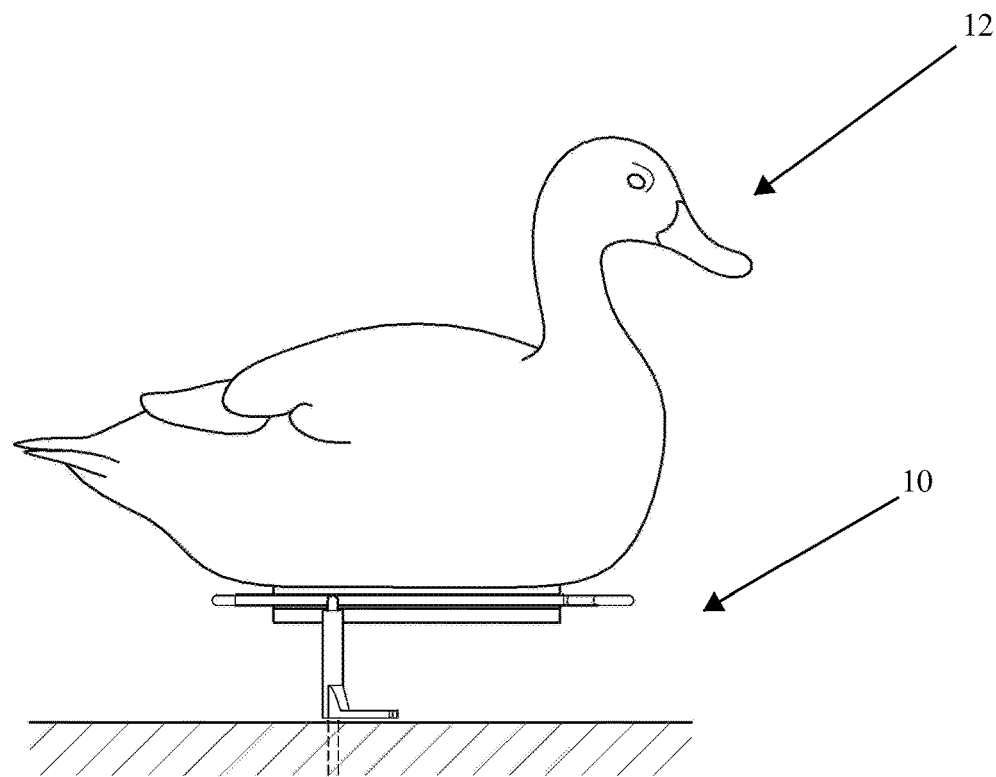
FIG. 7 is a right side elevation view of the version shown in FIG. 5 with the attached waterfowl decoy shown fully inserted into a ground surface.
Figure 8:
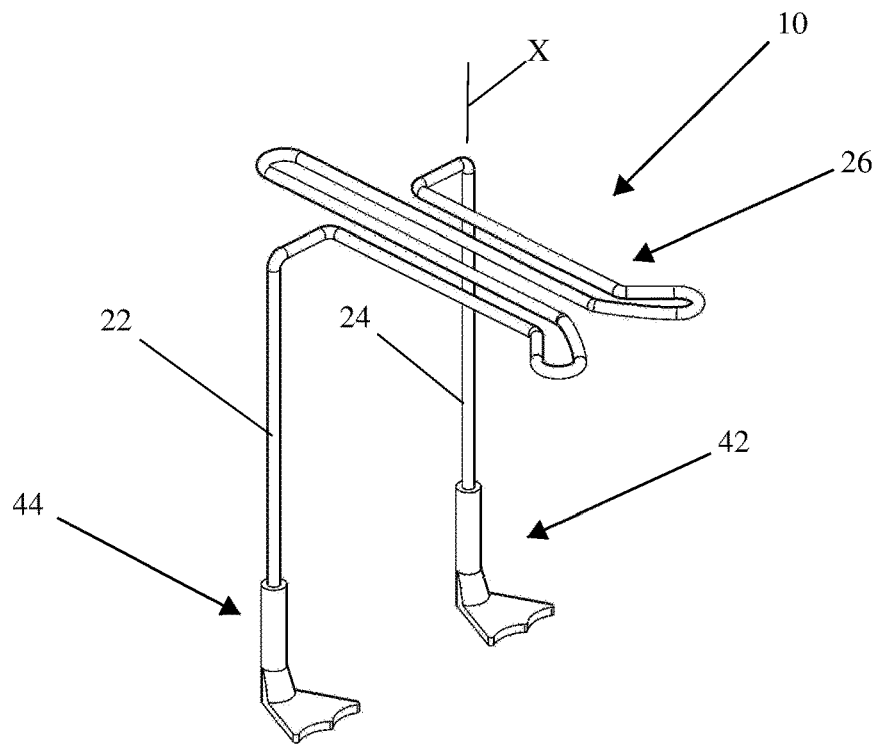
FIG. 8 is a front, side perspective of a version showing slidable lower extremities.

Referring to FIG. 5-FIG. 7, by way of background, the floatation type waterfowl decoy 12 imitates a live waterfowl animal. Typically, the waterfowl decoy 12 generally comprises a body 14 and a ballast keel assembly 16. The ballast keel assembly 16 extends longitudinally along the bottom of the body 14 comprising a ballast keel stem 18, and a ballast flange 20 forming an inverted T cross section as shown in FIG. 5. In more detail, the ballast flange 20 is laterally symmetric and normal to the lower end of the keel stem 18.

Now referring to FIG. 1-FIG. 5, the waterfowl decoy support designated by numeral 10 will now be described in detail. In some versions, the waterfowl decoy support 10 generally comprises a first and second pair of elongated support rods 22, 24 and a decoy suspension arm 26 supported by the first and second elongated support rods 22, 24. In particular, the first and second support rods are each adaptable to be inserted into the ground (See FIG. 6) and the decoy suspension arm 26 is configured to receive and support the ballast keel assembly 16 of the waterfowl decoy 12 positioning the waterfowl decoy 12 above the elongated support rods 22, 24.

In the illustrated version, the pair of elongated support rods 22, 24 each have a base end 28 and a decoy attachment end 30 opposite the base end 28. The decoy suspension arm 26 is supported by the pair of elongated rods 22, 24 at the decoy attachment end 30. The decoy suspension arm 26 includes a first and second rails 32, 34 aligned substantially in parallel extending from a first end to an opposing second end forming an elongated keel gripping slot 36 therebetween. The keel gripping slot 36 defining a longitudinal axis. Ideally, the width of the keel gripping slot 36 is approximately $\frac{1}{8}^{th}$ of an inch.

Figure 9:
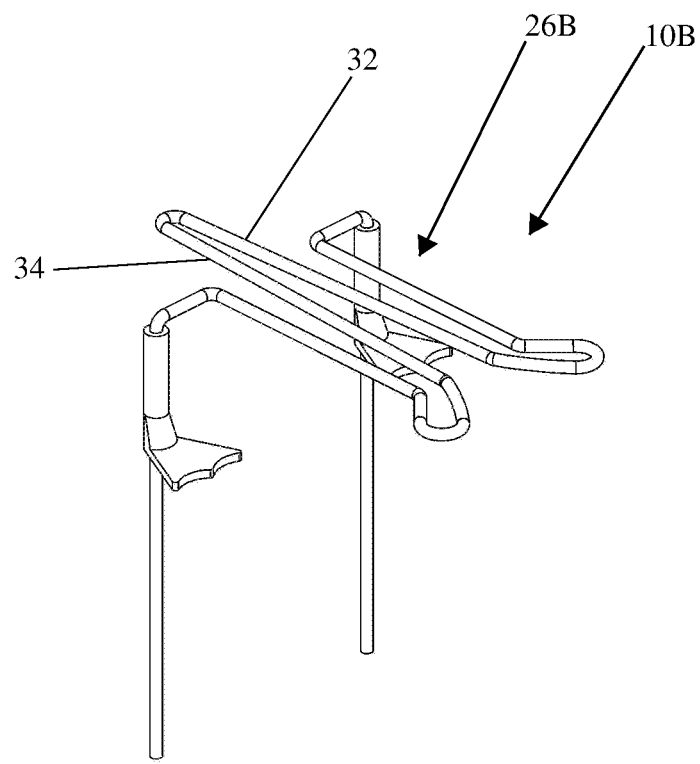
FIG. 9 is a front, side perspective of a version of the application.
Figure 10:
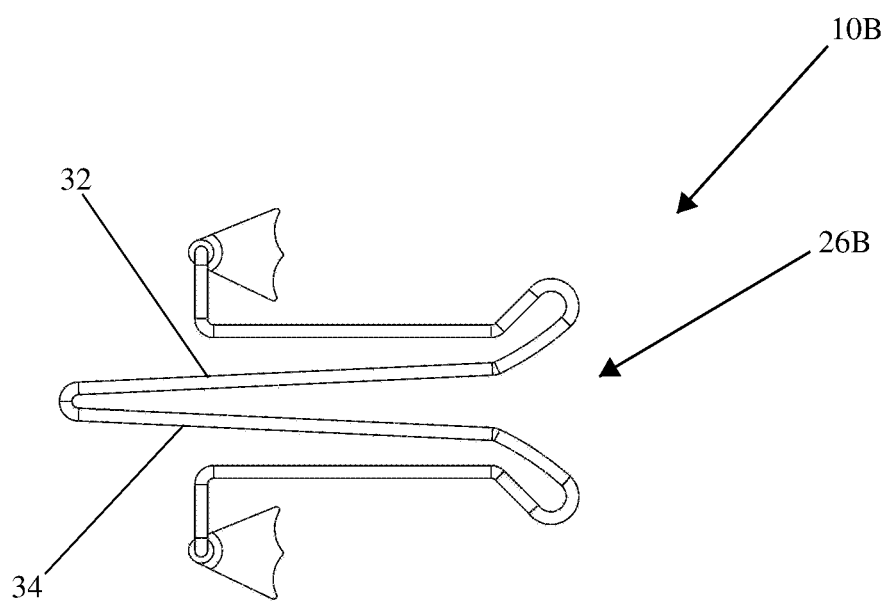
FIG. 10 is a top plan view of the version shown in FIG. 9.

In some versions, the elongated keel gripping slot 36 has a closed first end 38 and an opposing open second end 40. In other version the first and second ends 38, 40 may be configured to be open or closed depending on application. Other variations 10B may align the first and second rails 32, 34 of the suspension arm 26B at an angle as opposed to substantially in parallel as illustrated in FIG. 9 and FIG. 10.

Figure 1:
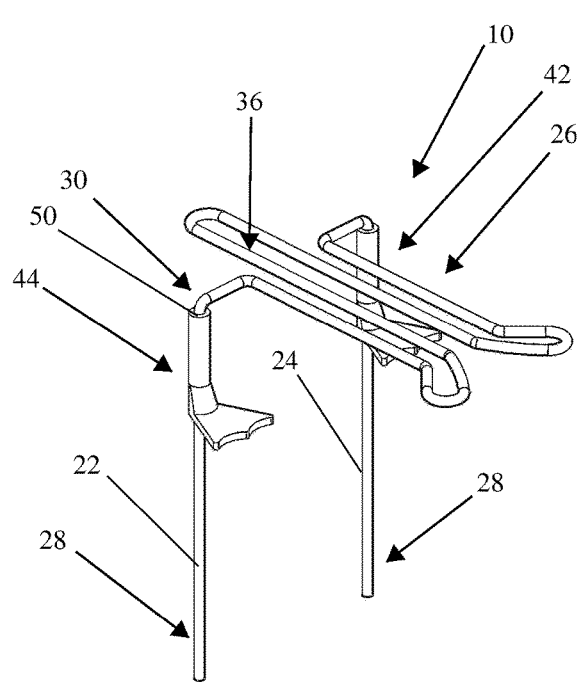
FIG. 1 is a front, side perspective view of a first version of the invention.
Figure 2:
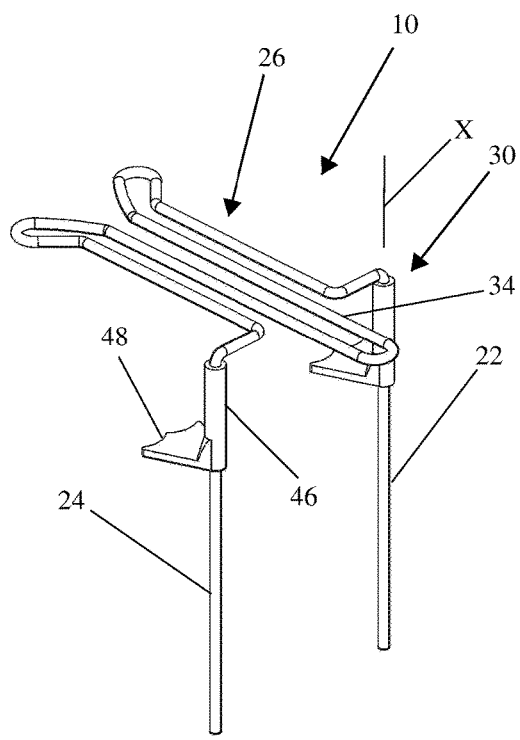
FIG. 2 is a rear, side perspective view of the version shown in FIG. 1.
Figure 3:
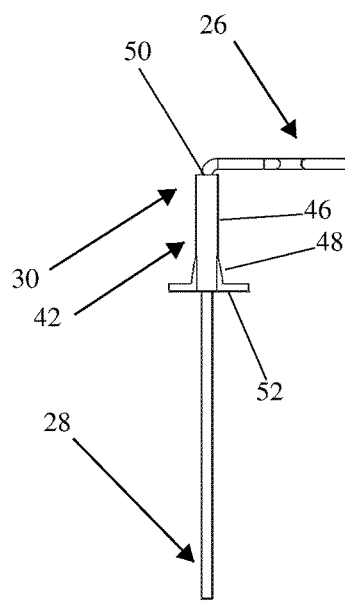
FIG. 3 is a rear elevation view of the version shown in FIG. 1.
Figure 4:
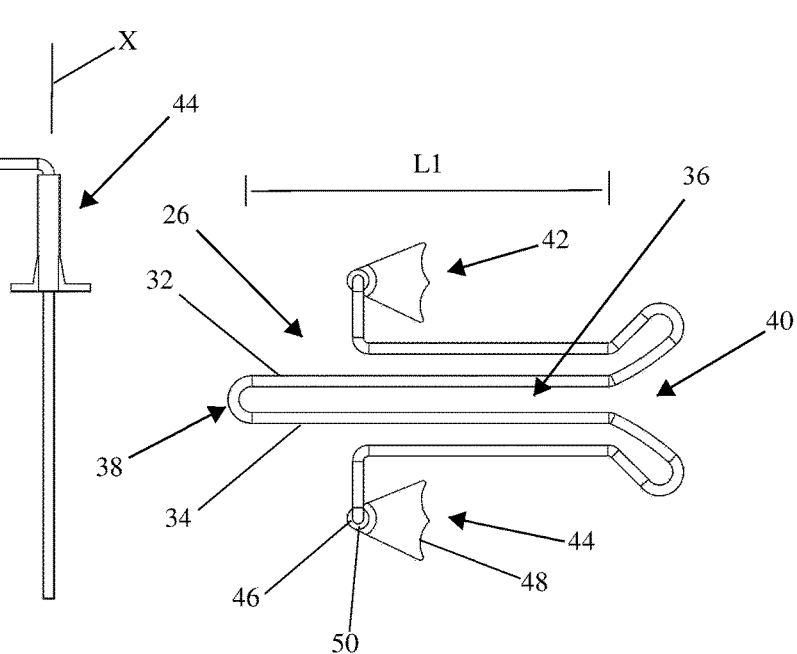
FIG. 4 is a top plan view of the version shown in FIG. 1.

In some versions as illustrated by FIG. 4, the decoy suspension arm 26 first end 38 or second end 40 may be configured to expand outward forming a coplanar v-shaped configured to guide and receive the ballast keel assembly 16 of the waterfowl decoy 12 into the elongated decoy gripping slot 36 while being attached.

As best illustrated by FIG. 4, in a version of the application, the decoy gripping slot 36 defines a length L1 extending between an aft end 38 to a forward end 40 having a midpoint. Ideally, in a version of the invention, the elongated support rods 22, 24 are positioned aft of the midpoint and normal to the longitudinal axis of the keel gripping slot 36. Other versions may position the first and second support rods 22, 24 at or forward of the midpoint, in order to provide stability based on the waterfowl decoy 12 center of gravity.

Referring to FIG. 5, preferably, each base end 28 of the pair of elongated rods 22, 24 terminates in a ground penetration spike 46. Moreover, ideally for purposes of simplicity that all of the components including the pair of elongated support rods 22, 24 and the decoy suspension arm 26 are formed of a single unitary length of material, preferably a metal material.

In some embodiments, the waterfowl decoy support 10 further comprises a first and second decoy imitation extremity portions 42, 44, wherein each extremity portion 42, 44 is operably configured to attach to a segment of a respective support rod 22, 24. Ideally, each extremity portion 42, 44 is configured to resemble and imitate the lower extremities of a live waterfowl animal, adapted to at least partially conceal the respective segment of the respective support rod 22, 24. For example, when the waterfowl decoy support 10 is inserted into a ground surface, the lower extremity portions 42, 44 cover the segments of the elongated support rods 22, 24 which remain above the ground emulating the waterfowl lower extremities.

In some versions and as illustrated, the extremity portions 42, 44 comprise a leg portion 46 and a foot portion 48, wherein the leg portion 46 defines a tube 50 which is configured to receive a segment of the respective elongated support rod 42, 44 therethrough and the foot portion 48 extends forward imitating a waterfowl's webbed feet. Ideally, the leg portion 46 and the webbed foot portion 48 are formed by a unitary, integral plastic mold. In the illustrated version, the foot portion 48 comprises a flat bottom surface 52 which provides a realistic adaption to a ground surface while in use. In other versions, the extremity portion 42, 44 may only comprise a leg portion 46 without the foot portion having the appearance of a singular tube.

As best illustrated by FIG. 6, in a version of the application, the waterfowl decoy body defines a length L2 extending between an aft end 15 and a forward end 17 having a midpoint 19. During attachment of the waterfowl decoy 12 to the decoy support 10, the elongated support rods 22, 24 are positioned aft of the midpoint 19. While a decoy is attached (FIG. 7), the aft support rod 22, 24 configuration provides superior stability while positioning the first and second decoy imitation extremity portions 42, 44 aft of the midpoint of the decoy body 14, providing a realistic imitation of the waterfowl decoy 12 lower extremities during a hunt. Other versions may position the first and second support rods 22, 24 at the midpoint or forward of the midpoint based on different applications.

In some versions, the extremity portions 42, 44 may be configured to be slidably attachable to the first and second support rods 22, 24, wherein each extremity portion 42, 44 may move along the longitudinal axis X of each respective support rod 22, 24 for application purposes. For example, if each ground support rod 22, 24 cannot be fully engaged with the ground surface due to rocks and other ground conditions, the slidable extremity portions 42, 44 may be adjusted downward in order to properly contact with the ground surface. Moreover, each extremity portion 42, 44 may be operably configured to be attachably removable in or to replace or exchange for other similar or differently featured lower extremity portions 42, 44 per decoy application.

The color of the extremity portions 42, 44 can be any color that is desired to imitate the appearance of waterfowl legs. Ideally, the color is either yellow or orange or a combination color thereof.

Other version of the lower extremity portions 42, 44 can be envisioned, such as variations in color, design, configuration, and texture in order to provide a variation of imitating duck features for different types of ducks and hunting applications. Therefore, this application should not be limited to the specific extremity configuration disclosed in the drawings.

The waterfowl decoy support 10 can be made in any manner and of any material chosen with sound engineering judgment. Preferably, materials will be strong, lightweight, long lasting, economic, and ergonomic. Construction of the waterfowl decoy support 10 can be made of any known material known in the art such as plastics, cast iron, aluminum, or stainless steel or a combination thereof.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed is:

1. A waterfowl decoy support, comprising:
   a first and second elongated support rods adaptable to be inserted into the ground, each having a base end, a decoy attachment end opposite the base end, and a support rod longitudinal axis;
   a decoy suspension arm supported by the first and second elongated rods, the decoy suspension arm comprising a first and second rails extending from an aft end to a forward end forming an elongated decoy gripping slot therebetween, the decoy gripping slot defining a length having a midpoint;
   a first connection member and a second connection member, each of the first and second connection members operably connecting the forward end of the decoy suspension arm with the respective first and second elongated support rod, wherein each connection member extends afterward from the forward end and aft of the midpoint of the length of the decoy gripping slot; and
   a first and second decoy imitation extremity portions, each extremity portion operably configured to attach to a segment of a respective support rod, wherein the extremity portion is configured to resemble the lower extremities of a live waterfowl animal, adapted to at least partially conceal the respective segment of the respective support rod.

2. The apparatus of claim 1, further including a flotation type waterfowl decoy in combination therewith, the decoy having a ballast keel stem and a ballast flange extending laterally from and normal to the stem, the stem being removably inserted in the decoy griping slot and the flange below the grip members to retain the decoy on the support in an attached position.

3. The apparatus of claim 2, wherein the waterfowl decoy comprises a decoy body defining a length extending between an aft end and a forward end and having a midpoint, wherein the first and second elongated support rods are positioned aft of the midpoint and normal to the longitudinal axis of the decoy gripping slot.

4. The apparatus of claim 1, wherein the waterfowl decoy comprises a decoy body defining a length extending between an aft end and a forward end and having a midpoint, wherein the first and second elongated support rods are positioned aft of the midpoint and normal to the longitudinal axis of the decoy gripping slot.

5. The apparatus of claim 1, wherein the waterfowl decoy defines a length extending between an aft end and a forward end having a midpoint, wherein the first and second decoy imitation extremity portions are positioned aft of the midpoint.

6. The apparatus of claim 1, wherein the decoy gripping slot defines a length wherein the first and second elongated support rods are positioned aft of the midpoint and normal to the longitudinal axis of the decoy gripping slot.

7. The apparatus of claim 1, wherein the first and second decoy imitation extremity portions are positioned aft of the midpoint.

8. The apparatus of claim 1, wherein the pair of elongated support rods and the decoy suspension arm are formed by a single unitary length of material.

9. The apparatus of claim 1, wherein each support rod base end terminates in a ground penetration spike.

10. The apparatus of claim 1, wherein the decoy suspension forward end expands outward forming a coplanar v-shaped configured to easily receive the keel of the decoy.

11. The apparatus of claim 1, wherein the extremity portion comprises a leg portion and a foot portion, wherein the leg portion defines a tube which is configured to receive a segment of the respective elongated support rod therethrough and the foot portion extending forward of the respective support rod.

12. The apparatus of claim 11, wherein each leg portion and foot portion forms an integral plastic piece.

13. The apparatus of claim 11, wherein the foot portion comprises a flat bottom, thereby providing a realistic adaption to a ground surface.

14. The apparatus of claim 1, wherein the extremity portion is operably slidable along the length of the respective support rod.

15. The apparatus of claim 1, wherein the extremity portion is removably attached to the respective elongated support rod.

16. A waterfowl decoy support, comprising:
   a first and second elongated support rods adaptable to be inserted into the ground, each having a base end, a decoy attachment end opposite the base end, and a support rod longitudinal axis;
   a decoy suspension arm supported by the first and second elongated rods, the decoy suspension arm comprising a first and second rails extending from an aft end to a forward end forming an elongated decoy gripping slot therebetween; the decoy gripping slot defining a length having a midpoint;
   a first connection member and a second connection member, each of the first and second connection members operably connecting the forward end of the decoy suspension arm with the respective first and second elongated support rod, wherein each connection member extends aftward from the forward end and aft of the midpoint of the length of the decoy gripping slot, wherein the first and second elongated support rods are positioned aft of the midpoint; and a first and second decoy imitation extremity portions, each extremity portion operably configured to attach to a segment of a respective support rod, wherein the extremity portion is configured to resemble the lower extremities of a live waterfowl animal, adapted to at least partially conceal the respective segment of the respective support rod;

wherein the extremity portion comprises a leg portion and a foot portion, wherein the leg portion defines a tube which is configured to receive a segment of the respective elongated support rod therethrough and the foot portion extending forward of the respective support rod.

17. The apparatus of claim 16, wherein the first and second decoy imitation extremity portions are positioned aft of the midpoint.

18. The apparatus of claim 16, wherein the waterfowl decoy defines a length extending between an aft end and a forward end having a midpoint, wherein the first and second decoy imitation extremity portions are positioned aft of the midpoint.

19. A waterfowl decoy support, comprising:
a first and second elongated support rods adaptable to be inserted into the ground, each having a base end, a decoy attachment end opposite the base end, and a support rod longitudinal axis;

a decoy suspension arm supported by the first and second elongated rods, the decoy suspension arm comprising a first and second rails extending from an aft end to a forward end forming an elongated decoy gripping slot therebetween, the decoy gripping slot defining a length having a midpoint;

a first connection member and a second connection member, each of the first and second connection members operably connecting the forward end of the decoy suspension arm with the respective first and second elongated support rod, wherein each connection member extends aftward from the forward end and aft of the midpoint of the length of the decoy gripping slot, wherein the first and second elongated support rods are positioned aft of the midpoint; and a first and second decoy imitation extremity portions, each extremity portion operably configured to attach to a segment of a respective support rod, wherein the extremity portion is configured to resemble the lower extremities of a live waterfowl animal, adapted to at least partially conceal the respective segment of the respective support rod;

wherein the extremity portion comprises a leg portion and a foot portion, wherein the leg portion defines a tube which is configured to receive a segment of the respective elongated support rod therethrough and the foot portion extending forward of the respective support rod;

wherein the waterfowl decoy defines a length extending between an aft end and a forward end having a midpoint, wherein the first and second decoy imitation extremity portions are positioned aft of the midpoint.

* * * * *